United States Patent
O'Neal, Jr.

[11] 3,781,805
[45] Dec. 25, 1973

[54] KEY CARD OPERATED SECURITY AND ACCOUNTABILITY SYSTEM

[76] Inventor: Charles R. O'Neal, Jr., 10043 52nd St., Tampa, Fla. 33617

[22] Filed: Nov. 12, 1971

[21] Appl. No.: 198,333

[52] U.S. Cl. ................ 340/149 R, 340/147 MD
[51] Int. Cl. ...................... G06k 7/06, H04q 9/00
[58] Field of Search ............... 340/149 A, 149 R, 340/147 MD, 164 R

[56] References Cited
UNITED STATES PATENTS

| | | | |
|---|---|---|---|
| 3,383,657 | 5/1968 | Claassen et al. | 340/149 A |
| 3,403,380 | 9/1968 | Welch | 340/149 A |
| 3,419,881 | 12/1968 | Yamamoto et al. | 340/149 A |
| 3,500,326 | 3/1970 | Benford | 340/164 R |
| 3,544,769 | 12/1970 | Hedin | 340/149 A |

*Primary Examiner*—Donald J. Yusko
*Attorney*—John W. Behringer et al.

[57] ABSTRACT

A logic controlled security and accountability system. An area to be secured is locked by an electrically actuated lock. A coded program card is inserted into the lock control apparatus and programs it to respond only to a predetermined code. When an authorized person desires access, he inserts into the lock control apparatus a key card coded with that predetermined code to cause an actuating signal to be applied to the lock. The program and key cards can be made of an inexpensive material and coded individually for each successive guest, and so if the system is installed in a hotel, for example, no loss is experienced and security is not jeopardized should a guest fail to return his key card when he checks out. Additionally, in a hotel or similar facility utilizing the system in conjunction with a computerized billing system, once a guest has inserted his program card into the lock control apparatus associated with his room, his key card can be used in shops within the hotel to charge purchases to the account of his room.

11 Claims, 8 Drawing Figures

PATENTED DEC 25 1973 3,781,805

PROGRAM LOGIC CARD WITH LOGIC

FIG. 2

KEY CARD WITH LOGIC

KEY CARD OPERATED SECURITY AND ACCOUNTABILITY SYSTEM

The present invention pertains to a security and accountability system. More particularly, the present invention pertains to a logic controlled electronic system for providing security of desired areas and for accounting for purchases of items.

In many situations, it is desired that a given area be accessible only to a limited number of persons. In some of the situations, it might be desired that the area be accessible to one person for a brief period of time following which it would be accessible to another person for a similar period of time. Thus, for example, a hotel room must be accessible to a guest during the time that he is registered for that room, and, after that guest has departed, the room would be accessible to another guest to the exclusion of all other people including the first guest. Conventional key operated locks are generally utilized in such situations. The most common problem resulting from the use of such locks for hotel rooms is for a guest to forget to return his key to the hotel management at the time he checks out of the hotel. Not only is this costly because of the necessity of replacing the key, but also it reduces the security of the room for subsequent occupants since the guest who has kept a key can return to have access to the room. Even if the guest turns in his key at the time he checks out of the hotel, it is still conceivable that he may have had a duplicate key made to provide him with access to the room.

Many hotels include on their premises, shops such as newsstands, barber shops, and restaurants. In these shops, it is frequently permissible for a hotel guest to charge items which are then added to the guest's hotel bill. This, of course, presents a problem of ensuring that the person desiring to make such a charge is, in fact, a guest at the hotel. In addition, if a charge is made by a hotel guest just prior to his checking out of the hotel, the amount of that charge may not have been transmitted to the cashier by the time the guest desires to pay his bill. Accordingly, either the hotel does not receive the money and must subsequently contact the guest about it, or considerable delay is experienced at the time of checkout while such charges are ascertained.

The present invention is a logic controlled electronic security and accountability system by means of which access to an area can be limited to only authorized persons. The present invention can be utilized in conjunction with a computerized billing system in a hotel, for example, to permit such authorized persons to charge items in adjacent places such as shops within the hotel. In accordance with the present invention, a lock on the area to be secured is controlled by a mechanism that responds only to receipt of two compatible sets of coded signals. A first coded device programs the mechanism so that it will respond only to a predetermined, compatible code. A second coded device containing taht actuating code is then utilized by authorized persons to actuate the mechanism, unlocking the area.

In the illustrative example of a hotel room, a guest checking into the hotel is given two coded cards. The first of these he inserts into a receiver adjacent to or on the door to his assigned room with the result that the lock-control mechanism for that room is programmed to respond only to the predetermined compatible code contained in the second card. Then, when the guest desires to enter the room, he inserts the second coded card into a second receiver to actuate the lock mechanism, following which he removes the second card from that receiver, opens the door, and enters the room. During the time the first card is within its receiver, similar receivers in shops within the hotel are programmed to respond to the guest's second coded card by charging to the account of his assigned room the amount of purchases which he makes in such shops. The total of each guest's charged purchases is always available at the cashier, and so no waiting for this information is necessary when a guest checks out of the hotel. The first coded card is removed from the first receiver at the time the room is prepared for the next guest, and that next guest is given a new pair of coded cards bearing a different code. Thus, the unlocking mechanism and the accounting system will respond to that guest's coded cards, but will no longer respond to the cards of the first guest. Consequently, the first guest cannot again gain access to the room and cannot charge items to the account of the room in systems in accordance with the present invention offering that option. The cards can be made of an inexpensive material and coded at the time the guest checks in. The cards are disposed of following checkout of the guest, and, accordingly, there is no loss due to the guest failing to return a card.

These and other aspects and advantages of the present invention are more apparent in the following detailed description and claims, particularly when considered in conjunction with the accompanying drawings. In the drawings:

Figure 1:
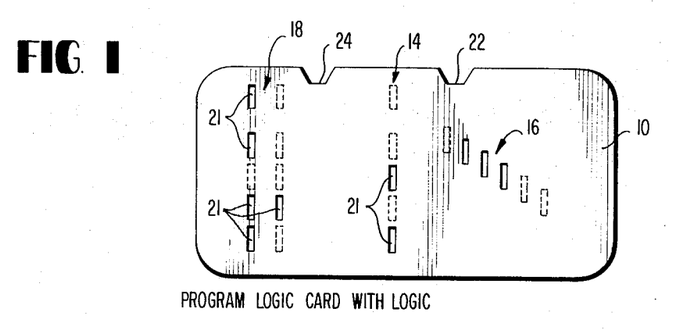
FIG. 1 and FIG. 2 are plan views of coded cards suitable for use in a security and accountability system in accordance with the present invention.
Figure 2:
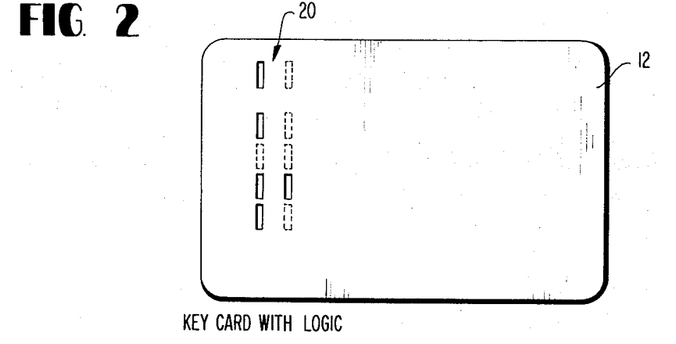

FIGS. 1 and 2 depict code devices in the form of cards suitable for use in conjunction with the present invention. Program card 10 depicted in FIG. 1 is utilized to program the apparatus to respond only to corresponding key card 12 of FIG. 2. As illustrated by the examples of FIGS. 1 and 2, program card 10 and key card 12 have a plurality of code positions. For example, program card 10 can include a set of sequence check code positions 14 and a set of sequence number code positions 16 which are utilized to insure that each time a hotel room is vacated, a different set of coded cards is utilized to control its lock. Additionally, program card 10 has a set of lock control code positions 18 which are utilized to program the locking mechanism of the assigned room to respond only to the code of the associated key card 12. Key card 12 includes only a set of lock control code positions 20 corresponding with code positions 18 on card 10. Cards 10 and 12 are coded by making openings at selected ones of the code positions. Thus, as illustrated in FIGS. 1 and 2, holes 21 are punched in selected ones of the positions of code position sets 14, 16, 18, and 20 on program card 10 and key card 12. Program card 10 has a first notch 22 and a second notch 24 in one of its edges. If the system is to be utilized in a hotel, the locations of notches 22 and 24 can be coded to correspond with the number of the hotel room with which the card is to be utilized. Notches 22 and 24 could be in any edge of program card 10, or additional coded openings could be made in program card 10 in place of notches 22 and 24, so long as the associated switches are positioned correspondingly. Program card 10 and key card 12 can be made of any suitable material such as a light cardboard or a light plastic. Preferably, program card 10 and key card 12 are of different dimensions so that one cannot be mistakenly placed in the receiver intended for the other. Thus, for example, key card 12 might be of a size similar to that of a standard business card or a standard credit card, making it easy to carry in the wallet or pocket, while program card 10 is of a slightly smaller size.

Figure 3:
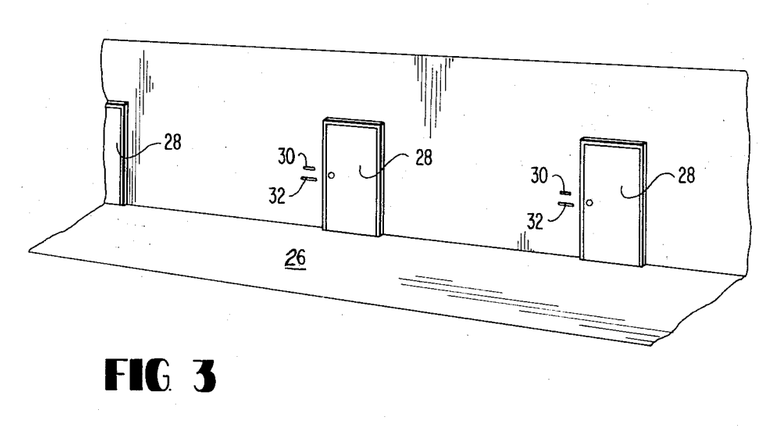
FIG. 3 depicts an illustrative installation of the present invention in the form of a hotel hallway with doors having locks actuated by mechanisms under the control of apparatus in accordance with the present invention.

FIG. 3 illustrates a hallway 26 within a hotel and having a plurality of doors 28 leading to hotel rooms and locked by mechanisms under the control of apparatus in accordance with the present invention. Associated with each door 28 is a programable code-responsive signal for actuating the lock on the door 28, a programing device for programing the programable code-responsive signal to generate a lock-actuating signal in response to a predetermined code signal, and a code signal for applying the predetermined code signal to the programable code-responsive signal. First receiver 30, adjacent door 28, is adapted to receive a program card 10 and a second receiver 32 adapted to receive a key card 12. When a guest checks into the hotel, he is given a program card 10 and a key card 12 which are, at that time, coded, for example by punching holes at selected ones of the code positions. In the present illustrative example, program card 10 is coded by punching a plurality of the lock control code positions 18, and key card 12 is coded by punching the corresponding lock control code positions 20 so that coincidence exists in the punched or coded lock control code positions 18 and 20. However, the use of a program card and key card which would require use of different lock control code positions is within the scope of the present invention so long as the program card programs the lock actuating and accounting mechanism to respond only to the predetermined compatible coding of the associated key card. Program card 10 is further coded by punching the appropriate sequence check code positions 14 and sequence number code positions 16, and by forming notches 22 and 24 in locations appropriate for the number of the room to which the guest is being assigned.

Once he has completed checking in at the hotel registration desk, the guest is given the coded program card 10 and key card 12. The guest then finds his assigned room and inserts his program card 10 into its first receiver 30. Card 10 can only be inserted partially into receiver 30 at that time.

Figure 4:
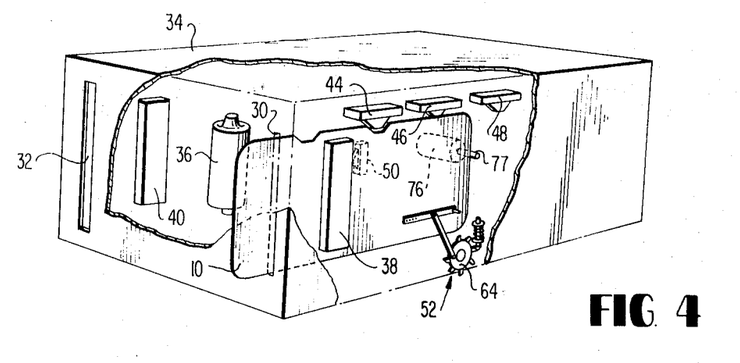
FIG. 4 is a perspective view of a lock control module in a first operating condition and suitable for use in accordance with the present invention.

FIG. 4 depicts a lock control module 34 including first receiver 30 and second receiver 32 adapted to receive program card 10 and key card 12, respectively. A light source 36 is positioned within lock control module 34 between first receiver 30 and second receiver 32 so that, with program card 10 and key card 12 in place and light source 36 energized, light from source 36 shines upon program card 10 and key card 12. A first set of light responsive elements or photoelectric transducers 38 is positioned within module 34 on the side of first receiver 30 opposite light source 36. Likewise, a second set of light responsive elements or photoelectric transducers 40 is positioned within module 34 on the side of second receiver 32 opposite light source 36. By way of illustration, the photoelectric transducers within sets 38 and 40 might be photocells, photodiodes, or photoresistors, and will be referred to as photodetectors.

Aligned adjacent one edge of first receiver 30 are first, second, and third switches 44, 46, and 48, each of which can be a spring-biased single-pole-double-throw switch which is operated from its first position to its second position when the edge of program card 10 depresses its actuating element or pushbutton. An additional spring biased switch 50 is provided adjacent the end surface of second receiver 32 to be operated by key card 12 when the key card is fully inserted into second receiver 32.

Figure 5:
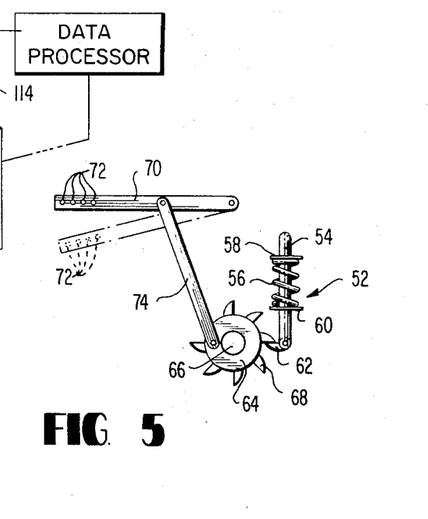
FIG. 5 is a diagrammatic representation of a sequence switch assembly device suitable for use in conjunction with the present invention.

If desired, to provide greater insurance that the properly assigned guest has inserted program card 10, sequence switch assembly 52 is positioned adjacent first receiver 30 to be actuated by program card 10 upon its insertion completely into the first receiver. FIG. 5 illustrates a suitable sequence switch assembly 52. Cam 54 is normally biased by spring 56 to a position in the path of program card 10 as the program card 10 is inserted into first receiver 30. Spring 56 acts against first stop 58, attached to cam 54, and second stop 60, attached to lock control module 34. Finger 62 is rotatably mounted on the end of cam 54 opposite that end which is contacted by program card 10. Sequence wheel 64 is rotatably mounted to lock control module 34 about its central shaft 66. A plurality of fingers 68 extend from the periphery of sequence wheel 64. Adjacent its first end, arm 70 has a photodetector set 72, including one or more, and preferably four, photodetectors 72 as depicted in FIG. 5. The second end of arm 70 is pivotally attached to lock control module 34. One end of arm 74 is pivotally connected to arm 70 between the first and second ends thereof. The second end of arm 74 is pivotally connected to sequence wheel 64.

When a program card is fully inserted into first receiver 30, it depresses cam 54, causing finger 62 to move downwardly. As finger 62 moves downwardly, it contacts a finger 68 on sequence wheel 64, and finger 62 pivots so that finger 62 passes that finger 68. When that program card 10 is removed from first receiver 30, spring 56 pushes cam 54 upwardly, and finger 62 engages the finger 68 which it has just passed to cause sequence wheel 64 to rotate. This, in turn, causes arm 70 to rotate. Thus, by way of example, if arm 70 is in the full line position of FIG. 5 at the time a program card 10 is inserted into first receiver 30, upon removal of that program card from the first receiver, arm 70 will rotate to the broken line position of FIG. 5, moving photodetector set 72 to a new position.

Figure 6:
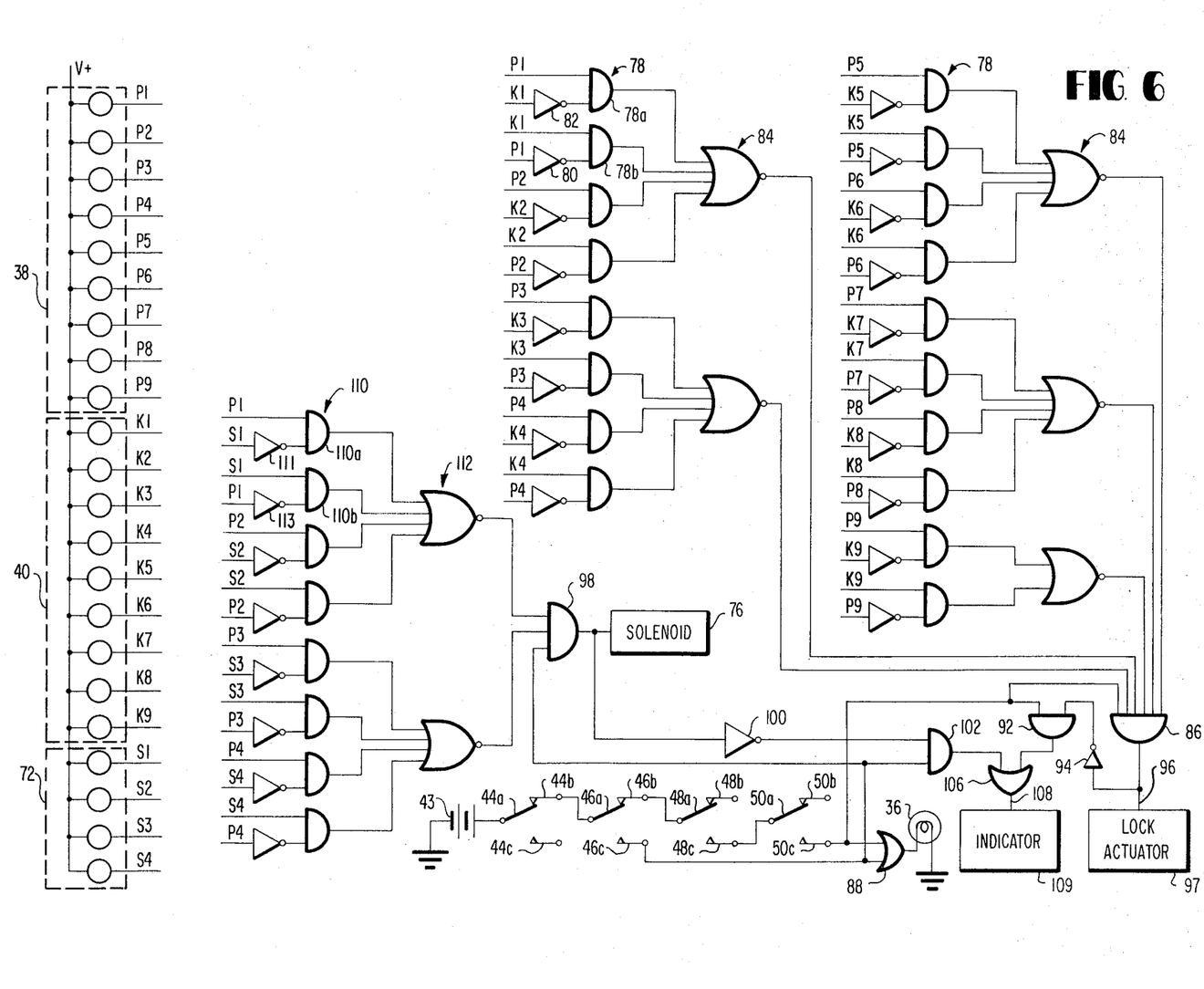
FIG. 6 is a logic diagram of circuitry suitable for use in controlling a lock mechanism in accordance with the present invention.

As seen in FIG. 4, solenoid 76 is positioned within lock control module 34 so that, in its deenergized state, its plunger 77 extends into first receiver 30 to prevent program card 10 from being fully inserted into the first receiver, FIG. 6 depicts logic circuitry suitable for use in conjunction with lock control module 34. Photodetector set 38, associated with first receiver 30 into which program card 10 is inserted, might include any number of photodetectors, for example nine photodetectors, which are designated P1 - P9 respectively. Photodetector set 40, associated with second receiver 32 into which key card 12 is inserted, includes a like number of photodetectors, and in FIG. 6, these are designated K1 - K9 respectively. Photodetector set 72, on arm 70, includes, for example, four photodetectors which are designated S1 - S4, respectively, in FIG. 6. Each of the photodetectors P1 - P9, K1 - K9, and S1 - S4 has one of its terminals connected to a suitable source of voltage. Each of the photodetectors S1 - S4 of photodetector set 72 on arm 70 is associated with a corresponding photodetector P1 - P4 of photodetector set 38 to ensure that a different program card 10 is inserted into first receiver 30. Each associated pair of photodetectors in photodetector sets 38 and 72, such as photodetector P1 and photodetector S1, is coupled as inputs to two AND gates of AND gate set 110, which determines whether coincidence exists in the light exposure state or activation state of the two photodetector sets 38 and 72. Thus, photodetector P1 is coupled directly as an input to AND gate 110a and is coupled through inverter 111 to one input of AND gate 110b, while photodetector S1 is coupled directly as an input to AND gate 110b and is coupled through inverter 113 to the second input of AND gate 110a. If either light from source 36 is reaching both photodetectors P1 and photodetector S1, or light from source 36 is blocked from both photodetector P1 and photodetector S1, coincidence exists in the activation state of photodetectors P1 and S1. In this coincidence condition, neither AND gate 110a nor AND gate 110b has an output signal. If light from source 36 reaches photodetector P1, but does not reach photodetector S1, then AND gate 110a provides an output, and, conversely, if light from source 36 reaches photodetector S1, but does not reach photodetector P1, then AND gate 110b provides an output. In like manner, each of the other photodetector pairs P2 and S2 through P4 and S4 is coupled to two AND gates of AND gate set 110 to determine whether coincidence exists in the light reaching the photodetector pairs.

The AND gates 110 have their outputs connected as inputs to a set of NOR gates 112. While one NOR gate could be utilized for this purpose, FIG. 6 depicts two separate NOR gates in set 112 which might be utilized for ease of manufacturing. If coincidence exists in the light reaching each of the photodetector pairs P1 and S1 through P4 and S4, then none of the AND gates 110 has an output, and so each of the NOR gates 112 has an output. Should there be a lack of coincidence in the light reaching the two photodetectors in one or more of the photodetector pairs, the one or more associated AND gates 110 provide outputs, with the result that the one or more associated NOR gates of NOR gate set 112 do not provide outputs. The several NOR gates 112 have their outputs connected as inputs to AND gate 98, the output of which is connected to solenoid 76 and is coupled through inverter 100 to one input of AND gate 102.

As illustrated in FIG. 6, each associated pair of photodetectors in photodetector sets 38 and 40, such as photodetector P1 and photodetector K1, is coupled as inputs to two AND gates of AND gate set 78, which determines whether coincidence exists in the light exposure state or activation state of the two photodetector sets 38 and 40. Thus, photodetector P1 is coupled directly as an input to AND gate 78a and is coupled through inverter 80 to one input of AND gate 78b, while photodetector K1 is coupled directly as an input to AND gate 78b and is coupled through inverter 82 to the second input of AND gate 78a. If either light from source 36 is reaching both photodetector P1 and photodetector K1 or light from source 36 is blocked from both photodetector P1 and photodetector K1, coincidence exists in the activation state of photodetectors P1 and K1. In this coincidence condition, neither AND gate 78a nor AND gate 78b has an output signal. If light from source 36 reaches photodetector P1, but does not reach photodetector K1, then AND gate 78a provides an output, and, conversely, if light from source 36 reaches photodetector K1 but does not reach photodetector P1, then AND gate 78b provides an output. In like manner, each of the other photodetector pairs P2 and K2 through P9 and K9 is coupled to two AND gates of AND gate set 78 to determine whether coincidence exists in the light reaching the photodetector pairs.

The AND gates 78 have their outputs connected as inputs to a set of NOR gates 84. While one NOR gate could be utilized for this purpose, FIG. 6 depicts five separate NOR gates in set 84 which might be utilized for ease of manufacturing. If coincidence exists in the light reaching each of the ten photodetector pairs P1 and K1 through P9 and K9, then none of the AND gates 78 has an output, and so each of the NOR gates 84 has an output. Should there be a lack of coincidence in the light reaching the two photodetectors in one or more of the photodetector pairs, the one or more associated AND gates 78 provide outputs, with the result that the one or more associated NOR gates of NOR gate set 84 do not provide outputs. The several NOR gates 84 have their outputs connected as inputs to AND gate 86.

Movable contact 44a of switch 44, which is located adjacent first receiver 30, is connected to one side of a source of voltage 43, the second side of which is tied to ground. Normally closed contact 44b of switch 44 is connected to moving contact 46a of switch 46. Normally closed contact 46b is connected to moving contact 48a of switch 48. Normally opened contact 46c of switch 46 is connected to one input of AND gate 98, to one input of AND gate 102, and to one input of OR gate 88. The output of OR gate 88 is connected to one terminal of light source 36, the second terminal of which is tied to ground. Normally open contact 48c of switch 48 is connected to movable contact 50a of switch 50 which is adjacent the end of second receiver 32. Normally open contact 50c of switch 50 is connected to a second input of OR gate 88. Contact 50c is also connected to one input of AND gate 86 and to one input of AND gate 92. There are no connections to normally-open switch contact 44c, or to normally closed switch contacts 48b and 50b, and, if desired, single-pole-single-throw switches, can be utilized for these switches so that these unused contacts are not provided. The output of AND gate 86 is coupled through inverter 94 to the second input of AND gate 92 and is connected to output line 96 which energizes lock actuating device 97 such as a solenoid that unlocks the associated door 28. AND gates 92 and 102 have their outputs coupled through OR gate 106 to indicator 109.

With no program card in first receiver 10, switches 44, 46 and 48 are each in their normally closed position with contacts 44a, 46a and 48a closed against contacts 44b, 46b, and 48b, respectively. Consequently, light source 36 is not energized, and AND gates 86, 92, 98, and 102 do not provide outputs. When a program card 10 is inserted into first receiver 30, it first engages switch 44, causing movable contact 44a to move from engagement with contact 44b to engagement with contact 44c. No change occurs in the energization state of light source 36 or AND gates 86, 92, 98, and 102. As program card 10 is inserted further into first receiver 30, it engages switch 46, causing moving contact 46a to change from its position against normally closed contact 46b to a position against with normally open contact 46c. Still, no change occurs in the energization state of light source 36 or AND gates 86, 92, 98 and 102. Program card 10 is inserted further into first receiver 30 until it is stopped by plunger 77 of solenoid 76. In this position, as depicted in FIG. 4, sequence check code positions 14 are adjacent photodetector set 38 and sequence number code positions 16 are adjacent photodetector set 72 on arm 70. In addition, in this position, the spring-biased pushbutton of switch 44 is adjacent notch 22 in program card 10, permitting moving contact 44a to move to its position against normally closed contact 44b. Voltage from source 43 is then applied through switch contacts 44a, 44b, 46a, and 46c and through OR gate 88 to energize light source 36. In addition, that voltage is applied to one input of AND gate 98 and to one input of AND gate 102.

Photodetector set 72 then monitors the sequence number coded in program card 10. The sequence number code positions 16 which have been punched, permit light to pass therethrough onto the corresponding photodetectors of set 72. Those photodetectors apply output signals, while the remaining photodetectors of set 42 do not. Likewise, photodetectors P1 – P4 of photodetector set 38 monitor the sequence check code positions 14 of program card 10, and those sequence check code positions which have been punched permit light to pass therethrough onto the corresponding photodetectors P1 – P4 of photodetector set 38. If in the particular position of arm 70, photodetector set 72 is positioned so that the sequence number coded in positions 16 program card 10 corresponds with the punched sequence check code positions 14, then AND gate 98 receives inputs on each of its lines, and so AND gate 98 applies an output signal to solenoid 76, energizing the solenoid, and to inverter 100. The voltage from switch contact 46c is applied as an input to AND gate 102. Since inverter 100 receives an input, it applies no input to AND gate 102. Consequently, there is no output from gate 102. Should the sequence number not correspond with the sequence check, there is no output from AND gate 98, and so inverter 100 applies an input to AND gate 102 which, together with the signal from switch contact 46c, causes an error signal to pass from gate 102 through OR gate 106 to indicator 109. Indicator 109 might include an alarm to indicate that an unauthorized person is attempting to gain access to the room or it might be any other appropriate indicator such as an indicator adjacent the door to inform the person applying the card that he is at the wrong room.

Figure 7:
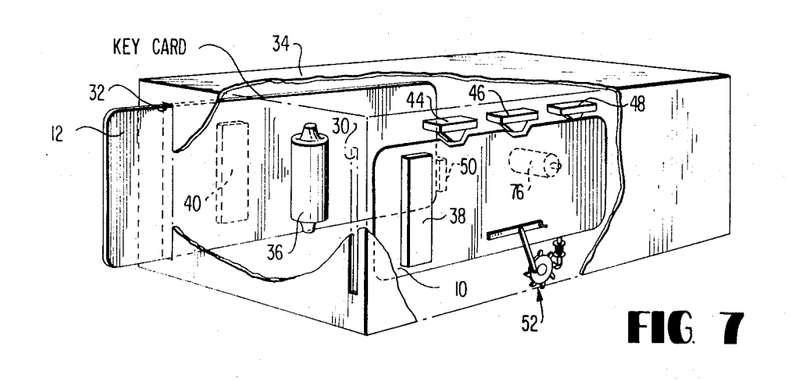
FIG. 7 is a perspective view of the lock control module of FIG. 4 in a different operating condition.

When solenoid 76 is energized, plunger 77 withdraws from first receiver 30, permitting program card 10 to be inserted fully into the first receiver as depicted in FIG. 7. The hotel guest is thereafter unable to remove program card 10 from lock control module 34. With program card 10 fully within first receiver 30, the spring-biased pushbuttons of switches 44 and 46 are adjacent notches 24 and 22 respectively in program card 10, and thus switch contacts 44a and 46a are closed against contacts 44b and 46b respectively. The push-button of switch 48 is depressed by program card 10, and so contact 48a is closed against contact 48c.

When the guest desires to enter the room, he inserts the corresponding key card 12 into second receiver 32. When fully inserted as depicted in FIG. 7, a portion of the key card, for example about 1 inch thereof, extends out of second receiver 32 to permit the user to grasp the key card readily for removal. In this position key card 12 engages switch 50, causing its contact 50a to close against contact 50c. Voltage is then applied through switch contacts 44a, 44b, 46a, 46b, 48a, 48c, 50a, and 50c and through OR gate 88 to light source 36, energizing the light source. In addition, voltage is applied from contact 50c to one input of AND gate 86 and to one input of AND gate 92. Light from source 36 shines upon program card 10 and key card 12. The circuitry of FIG. 6 then determines whether the key card 12 that has been inserted into second receiver 32 is compatible with the program card 10 within first receiver 30. In the illustrative example shown, this requires that coincidence exist between the punched or coded ones of the lock control code positions 18 in program card 10 and the punched or coded ones of the lock control code positions 20 in key card 12. If there is coincidence of the coded positions, each of the NOR gates 84 applies a signal to AND gate 86, and so gate 86 applies a signal to inverter 94, with the result that AND gate 92 is blocked. The signal from gate 86 is also applied by output line 96 to the lock control mechanism for the associated door 28. Consequently, the door is unlocked and the user of the key card 12 has access to the room. If desired, the door unlocking mechanism can include as an option a delay on drop out, for example a delay in the order of 30 seconds, so that after unlocking the door with his key card, the hotel guest can withdraw the key card from second receiver 32 and still have sufficient time to open the door before it again locks.

If program card 10 and key card 12 are coded in an incompatible manner so that there is a lack of coincidence in the coding in one or more of the sets of code locations in lock control code positions 18 and 20, one or more of the NOR gates 84 does not provide an output, and so AND gate 86 has no output. Consequently, the associated door 28 is not unlocked, and inverter 94 applies a signal to AND gate 92 which is also receiving an input from switch contact 50c. AND gate 92, therefore, applies an error signal through OR gate 106 to output line 108 to activate an alarm or cause other suitable response.

The system, of course, is not required to indicate that a wrong program card 10 or a wrong key card 12 has been inserted into one of the receivers, and this capability is only presented to illustrate options that might be included. If no indication is desired, then gates 92 and 102 and 106, inverters 94 and 100 and indicator 109 are omitted.

If the security and accountability system of the present invention is used in a hotel or other facility in which right of access to an area is to change frequently, the lock control code inserted at lock control code positions 18 and 20 of cards 10 and 12 can be selected in any of several manners. By way of illustrations, the numbers can be taken from a table of random numbers, or they can be generated by a computer under a suitable program at the time the room assignment is given the hotel guest. Alternatively, of course, they can be arbitrarily assigned by the hotel personnel, although this method does not insure such a degree of randomness.

Figure 8:
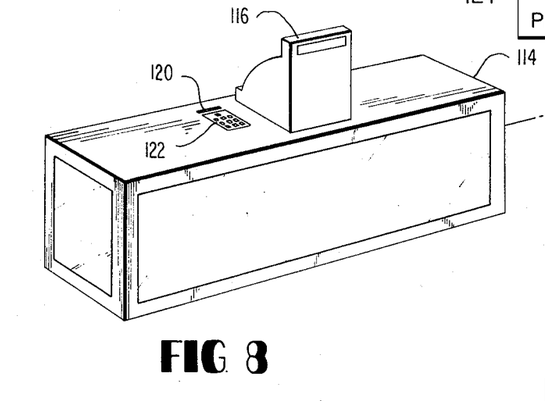
FIG. 8 illustrates a shop utilizing an accountability system in accordance with the present invention.

If a hotel utilizing the system of the present invention has available a computer or other data processor for its accounting and billing, once a guest has checked into the hotel and inserted his program card 10 into the first receiver 30 associated with his assigned room, records of purchases made by him at shops within the hotel and charged to the account of his room can be supplied to the accounting and billing system by means of the system of the present invention. Such a data processor or computer is illustrated, for example, in U.S. Pat. No. 2,959,351. FIG. 8 illustrates a shop 114 which might be located within a hotel equipped with such a system. Cash register 116 is located in shop 114 to permit cash transactions to be made. Adjacent cash register 116 is a second receiver 120 similar to second receiver 32 within lock control module 34. When a guest registered at the hotel desires to charge a purchase to the account of his room, his room number is applied to the system by means of numerical keyboard 122, and his key card 12 is inserted into the second receiver 120. A set of photodetectors K1 - K9 in second receiver 120 monitor the lock control code positions 20 on key card 12 and have their outputs combined by means of OR gates with the corresponding outputs from photodetectors K1 - K9 of photodetector set 40 within the lock control module 34 associated with the room which has been identified at keyboard 122. Insertion of key card 12 into second receiver 120 also actuates a switch to apply a signal to that lock control module 34 to energize the light source 36 therein and to disable photodetectors K1 - K9 of the photodetector set 40 therein. If the key card 12 is compatible with the program card 10 so that coincidence exists between the lock control code positions 18 in the program card 10 within that lock control module 34 and the lock control code positions 20 in the key card 12 within second receiver 120, a signal is returned to shop 114 so indicating and enabling the amount of purchase, which is then applied to the keyboard of cash register 116, to be added to the guest's account in data processor or computer 124. Alternatively, the lock control codes presently in use in the hotel can be stored within the accounting and billing computer in conjunction with the associated room numbers. Then the circuitry of lock control module 34 need not be utilized to charge purchases to the account of a guest's room. Instead, when the guest's key card 12 is inserted into second receiver 120 in the shop 114, the code signals are applied to the computer which charges the purchase to the room associated with that code. Since the lock control codes are random and not duplicated, the code's continued presence in the computer in conjunction with the room number will verify that the guest has not yet checked out of the hotel. By way of example. U.S. Pat. No. 3,544,769 illustrates suitable interconnections of circuitry to accomplish an accounting function such as that which can be performed with the system of the present invention.

Preferably each door 28 is provided with means permitting the hotel management to unlock the door manually to permit access to the room for the maid service, and in event of emergency. After a guest has checked out of the hotel, his program card 10 is removed from first receiver 30, for example through a locked access panel within the room, at the time the room is being prepared for another guest.

The system of the present invention can be provided with power from the main electrical system of the building in which it is installed, through appropriate voltage control equipment. Alternatively, it can be powered by other means, for example 12 volt batteries such as those used in automobiles.

While program card 10 and key card 12 have been illustrated with nine lock control code positions 18 and 20, any number can be utilized. The larger the number of positions, of course, the larger the available number of code combinations.

The security system of the present invention can be utilized for numerous applications in addition to the illustrative example of a hotel. Thus, for example, individual homes can be secured by such a system and bank vaults can utilize such a system, thus permitting the vault combination to be changed readily each day. Likewise, the system might be used for apartment houses, desk drawers, automobiles, secured areas of industrial plants, and other areas where access is to be limited to authorized personnel. By means of this system, a person can code everything he has with the same code so that he needs but one key card to permit access to them all, for example, his home, his office, his car, and his bank safe deposit box.

If the security system of the present invention is used to secure an area at which the same person or persons have right of access for a substantial period of time, for example at an individual's home or a bank vault, then the entrance to first receiver 10 can be within the home, and the circuitry utilized to determine that the proper program card has been inserted is not required. In such a system, then, switches 44, 46 and 48, photodetector set 72 and its associated inverters, gates 88, 92, 98, 102, 106, 110, and 112, solenoid 76, indicator 109, and associated circuitry could be omitted. Such a system could utilize a small memory device such as an alterable read-only memory to program the system to respond to a particular key card code, rather than use of program card 10 and first receiver 30 for this purpose. Additionally, such a system could be programmed, if desired, to respond to a particular key card only at particular times. Thus, for example, in a home, the system could be programmed to respond to a particular key card to admit a maid on one afternoon each week.

Should light source 36 be disabled when program card 10 is within first receiver 30, for example by a light bulb burning out, it is desirable to insure that the system will not unlock the door in response to any key card placed in second receiver 12. To do this, an additional photodetector can be placed immediately adjacent light source 36, so that it is activated whenever light source 36 is energized, and the output of this additional photodetector is applied as an additional input to AND gates 86 and 98. This will require that light source 36 be activated to operate the system. Alternatively, additional gating circuitry could be utilized to provide this check on light source 36.

Although the system has been disclosed with the several code positions monitored by means of light passing through coded openings to photodetectors, other code monitoring techniques could be used. Thus, for example, coded openings could be sensed electrically by wire brushes, mechanically by metal fingers, or pneumatically. Alternatively, the system could be implemented to respond to a proper set of finger prints, voice-coded signals, or voice prints. A suitable timer can be included to limit access to particular times of the day.

It is thus seen that although the present invention has been disclosed with reference to preferred embodiments, numerous rearrangements and modifications can be made, and still the result would be within the scope of the invention.

What is claimed is:

1. A lock control apparatus for controlling a lock which normally assumes a first condition and which in response to an actuating signal assumes a second condition, one of the first and second conditions being a locked condition, the other of the first and second conditions being an unlocked condition, said lock control apparatus comprising:
   first receiving means adapted to receive a first coded device bearing a first plurality of coded indicators presenting a first predetermined code indication;
   second receiving means adapted to receive a second coded device bearing a second plurality of coded indicators presenting a second predetermined code indication;
   light source means adjacent said first and second receiving means for shining light onto coded devices within said first and second receiving means;
   a first plurality of photodetectors adjacent said first receiving means for simultaneously generating a first plurality of code indication signals indicative of the first predetermined code indication as indicated by light from said light source means impinging upon coded indicators in a coded device within said first receiving means;
   a second plurality of photodetectors adjacent said second receiving means for simultaneously generating a second plurality of code indication signals indicative of the second predetermined code indication as indicated by light from said light source means impinging upon coded indicators in a coded device within said second receiving means;
   signal generating means connected to said first and second pluralities of photodetectors for generating an actuating signal in response to a preset condition of compatibility between the first plurality of code indication signals and the second plurality of code indication signals; and
   coupling means connected to said signal generating means and adapted for connection to a lock which normally assumes a first condition and which in response to an actuating signal assumes a second condition, one of the first and second conditions being a locked condition and the other of the first and second conditions being an unlocked condition, for applying the actuating signal to the lock.

2. A lock control apparatus as claimed in claim 1 in which said first plurality of photodetectors is on the side of said first receiving means opposite said light source means for detection of light passing through coded indicator openings in a coded device within said first receiving means and in which said second plurality of photodetectors is on the side of said second receiving means opposite said light source means for detection of light passing through coded indicator openings in a coded device within said second receiving means.

3. A lock control apparatus as claimed in claim 1 in which said signal generating means generates an actuating signal in response to coincidence between the code indication signals in the first plurality of code indication signals and the code indication signals in the second plurality of code indication signals.

4. A lock control apparatus as claimed in claim 1 in which said signal generating means includes error signaling means for generating an error signal in response to insertion into said second receiving means of a coded device and the absence of said preset condition of compatibility.

5. A lock control apparatus as claimed in claim 1 further comprising purchase price indicating means, additional receiving means adapted to receive the second coded device, additional code detecting means adjacent said additional receiving means for generating a second plurality of code indication signals indicative of coded indicators in a coded device within said additional receiving means, and purchase price recording means connected to said purchase price indicating means and to said additional code detecting means for recording a purchase price indicated on said purchase price indicating means in response to said preset condition of compatibility between the first plurality of code indication signals and the additional receiving means second plurality of code indication signals.

6. A lock control apparatus as claimed in claim 1 further comprising a lock connected to said coupling means for receipt of an actuating signal therefrom, said lock normally assuming a first condition and in response to an actuating signal assuming a second condition, one of the first and second conditions being a locked condition and the other of the first and second conditions being an unlocked condition.

7. A lock control apparatus as claimed in claim 1 further comprising a first code card adapted to be coded with a first plurality of predetermined coded indicators and to be inserted into said first receiving means and a second code card adapted to be coded with a second plurality of predetermined coded indicators and to be inserted into said second receiving means.

8. A lock control apparatus as claimed in claim 7 in which said first code card is a first size and said second code card is a second size different from the first size.

9. A lock control apparatus for controlling a lock which normally assumes a first condition and which in response to an actuating signal assumes a second condition, one of the first and second conditions being a locked condition, the other of the first and second conditions being an unlocked condition, said lock control apparatus comprising:

first receiving means adapted to receive a first coded device bearing a first predetermined code indication and including blocking means normally assuming a blocking position in which said first receiving means is blocked to prevent insertion of a coded device fully thereinto while permitting insertion of a coded device partially thereinto, said blocking means in response to an unblocking signal assuming a retracted position permitting insertion of a coded device fully into said first receiving means;

second receiving means adapted to receive a second coded device bearing a second predetermined code indication;

light source means adjacent said first and second receiving means for shining light onto coded devices within said first and second receiving means;

a first set of photodetectors adjacent said first receiving means for generating a first set of code indication signals indicative of light from said light source means impinging upon code indications in a coded device within said first receiving means;

a second set of photodetectors adjacent said second receiving means for generating a second set of code indication signals indicative of light from said light source means impinging upon code indications in a coded device within said second receiving means;

a third set of photodetectors adjacent said first receiving means for generating a third set of code indication signals indicative of light from said light source means impinging upon code indications in a coded device within said first receiving means;

signal generating means connected to said first, second, and third sets of photodetectors and including unblocking means connected to said blocking means for applying an unblocking signal to said blocking means in response to generation by said third set of photodetectors of a third set of code indication signals indicative of a predetermined set of coded indicators in a coded device within said first receiving means, said signal generating means generating an actuating signal in response to a preset condition of compatibility between the first set of code indication signals and the second set of code indication signals while a coded device is fully inserted into said first receiving means; and coupling means connected to said signal generating means and adapted for connection to a lock which normally assumes a first condition and which in response to an actuating signal assumes a second condition, one of the first and second conditions being a locked condition and the other of the first and second conditions being an unlocked condition, for applying the actuating signal to the lock.

10. A lock control apparatus as claimed in claim 4 in which said unblocking signal generating means applies an unblocking signal to said blocking means in response to a preset condition of compatibility between the first set of code indication signals and the third set of code indication signals.

11. A lock control apparatus as claimed in claim 10 in which said third code detecting means includes stepping means for changing the third set of code indications each time a coded device is inserted into and subsequently withdrawn from said first receiving means.

* * * * *